US008442907B1

(12) United States Patent
Gunewardena et al.

(10) Patent No.: US 8,442,907 B1
(45) Date of Patent: *May 14, 2013

(54) METHOD, SOFTWARE PROGRAM, AND SYSTEM FOR RANKING RELATIVE RISK OF A PLURALITY OF TRANSACTIONS

(75) Inventors: Mel Gunewardena, New York, NY (US); Michael Pinedo, Brooklyn, NY (US); William R. Egan, Short Hills, NJ (US)

(73) Assignee: Goldman, Sachs & Co., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/536,397

(22) Filed: Aug. 5, 2009

Related U.S. Application Data

(63) Continuation of application No. 09/845,415, filed on Apr. 30, 2001, now Pat. No. 7,590,594.

(51) Int. Cl.
*G06Q 40/00* (2006.01)
(52) U.S. Cl.
USPC .............................................. 705/38; 705/39
(58) Field of Classification Search ................ 705/35–40
See application file for complete search history.

(56) References Cited

U.S. PATENT DOCUMENTS

| | | | |
|---|---|---|---|
| 5,729,700 A | 3/1998 | Melnikoff | |
| 5,812,987 A | 9/1998 | Luskin et al. | |
| 5,828,583 A | 10/1998 | Bush et al. | |
| 5,884,287 A | 3/1999 | Edesess | |
| 5,956,251 A | 9/1999 | Atkinson et al. | |
| 5,978,778 A | 11/1999 | O'Shaughnessy | |
| 6,003,018 A | 12/1999 | Michaud et al. | |
| 6,055,517 A | 4/2000 | Friend et al. | |
| 6,119,103 A | 9/2000 | Basch et al. | |
| 6,871,181 B2 | 3/2005 | Kansal | |
| 7,016,872 B1* | 3/2006 | Bettis et al. .................. | 705/36 R |
| 7,249,080 B1* | 7/2007 | Hoffman et al. ............ | 705/36 R |
| 2002/0023033 A1 | 2/2002 | Campbell et al. | |
| 2002/0055900 A1 | 5/2002 | Kansal | |
| 2002/0082852 A1 | 6/2002 | Greene et al. | |

* cited by examiner

*Primary Examiner* — Thu Thao Havan
(74) *Attorney, Agent, or Firm* — Perkins Coie LLP

(57) ABSTRACT

A method for ranking relative risk of a plurality of transactions, wherein each of the transactions has associated therewith a plurality of variables. In one embodiment the method includes assigning a value to each of the variables associated with each of the transactions, aggregating the values assigned to each of the variables on a transaction by transaction basis to produce an aggregate risk level for each transaction, and ranking each of the transactions relative to one another based upon the aggregate risk level corresponding to each transaction. A corresponding software program and system are also disclosed.

10 Claims, 13 Drawing Sheets

Fig. 2A

| Event - Order Match | Event - Broker Verification | Event - Financial Confirmation | Event - Settlement Confirmation | Event - Terms Confirmation |
|---|---|---|---|---|
| Elapsed Time | Elapsed Time | Elapsed Time | Frequency Of Notional | Elapsed Time |
| Historical Volatility | Historical Volatility | Historical Volatility | Time to Settlement Cut-off | Historical Volatility |
| Deviation From Average Volatility | Deviation From Average Volatility | Deviation From Average Volatility | Potential OD Rates | Deviation From Average Volatility |
| Mark-To-Market | Mark-To-Market | Mark-To-Market | Fail Recovery Time | Mark-To-Market |
| Trader Error Ratio | Trader Error Ratio | Trader Error Ratio | Payment Instruction Precedence | Trader Error Ratio |
| Sales Error Ratio | Sales Error Ratio | Sales Error Ratio | Regulatory Risk | Sales Error Ratio |
| Frequency Of Notional | Frequency Of Notional | Frequency Of Notional | Master Agreement (Provisions for Netting) | Incoming Confirm Method |
| Client Sensitivity | Execution Method | Execution Method | Client Operating Infrastructure | Outgoing Confirm Method |
|  |  | Client Sensitivity | Country Operating Infrastructure | Template Precedence |
|  |  | Client Operating Infrastructure | Client Sensitivity | Frequency Of Notional |
|  |  | Incoming Confirm Method | Liquidity Risk | Master Agreement (Provisions for Netting) |
|  |  | Outgoing Confirm Method | Settlement Confirm Operator | Product Complexity |
|  |  | Outgoing Confirm Delay/Elapsed Time |  | Client Sensitivity |
|  |  | Internal Credit Rating |  |  |
|  |  | Confirm Operator |  |  |

Fig. 2B

| |
|---|
| Average Historical Volatility – A moving average (e.g., six month moving average) of trades with the same currency pair as well as the same time to maturity. |
| Current Volatility – A measure of the current market volatility with respect to the currency pair and the time to maturity. |
| Trader/Sales Error Ratio – How often a sales rep or trader books trades that need to be amended compared to the total number of trades he/she books. |
| Mark to Market – The current market value of the trade. |
| Elapsed Time – The amount of time that has elapsed from when the trade was booked to the current time. |
| Frequency of Notional – Number of times a trade with the same notional on primary currency occurs. |
| Possibility of Duplicate Deal – Number of times a trade with the same notional on both the primary and secondary currency occurs. |
| Execution Method – How the trade was done, either through conventional routers, on the phone, through an electronic broker, or through a voice broker, for example. |
| Customer Sensitivity – A value assigned to indicate a client who has special needs, thus requiring heightened sensitivity. |
| Customer Infrastructure – A value assigned to indicate how strong or weak a client's operations processes are believed to be. |
| Incoming Confirm Method – Indicates how the trade was confirmed. The incoming confirm method could be either electronic, phone, fax, or email, for example. |
| Outgoing Confirmation Method – How was confirmation to the client dispatched (e.g., by fax, mail, or email). |
| Template Precedence - This refers to the "newness" of the trade. That is, how often has this type of trade been done before (or is this type of trade a completely new type with new "bells and whistles".) |
| Master Agreement (Provisions For Netting) - The trade may be done for a client or with a bank with which there is a "master agreement", because many trades may be done with that client or institution. The "provisions for netting" then imply that any transfer of funds is done after taking into account several trades with the same client within the same period. |
| Potential Overdraft Rates (Potential OD Rates) - If the transfer of funds is not done in a timely fashion or with the correct amounts, then with regard to one or more parties certain interest payments may start playing a role. |

METHOD, SOFTWARE PROGRAM, AND SYSTEM FOR RANKING RELATIVE RISK OF A PLURALITY OF TRANSACTIONS

RELATED APPLICATIONS AND PRIORITY CLAIM

This is a Continuation of prior U.S. patent application Ser. No. 09/845,415, filed Apr. 30, 2001, entitled, "METHOD, SOFTWARE PROGRAM, AND SYSTEM FOR RANKING RELATIVE RISK OF A PLURALITY OF TRANSACTIONS," to which priority under 35 U.S.C. §120 is claimed. The entire contents of the aforementioned application are herein expressly incorporated by reference.

FIELD OF THE INVENTION

The present invention relates to a method, software program, and system for ranking relative risk of a plurality of transactions. More particularly, the present invention relates to a method, software program, and system for ranking relative operational risk of a plurality of financial transactions.

By providing for the ranking of relative operational risk of a plurality of financial transactions, the present invention provides a mechanism for readily identifying "outlying" transaction risks (e.g., identifying the 10 riskiest transactions out of a group of 1000).

BACKGROUND OF THE INVENTION

Banks and other financial institutions typically attempt to identify and quantify risks associated with their business dealings. Two types of risks typically identified and quantified are credit risk and market risk. As their names imply, credit risk relates to risk associated with giving or receiving credit and market risk relates to risk associated with changes in market conditions.

A third type of risk, which banks and other financial institutions are just now beginning to address, is operational risk. One definition of operational risk promulgated by the Basel Committee on Banking Supervision (hereinafter "Basel Committee") is that operational risk is a risk component other than credit or market risk and which is "the risk of direct or indirect loss resulting from inadequate or failed internal processes, people and systems or from external events". The aforementioned definition will be adopted for the purposes of this application.

In any case, the Basel Committee proposes a number of approaches for allocating operating risk capital. In following the typical banking methodology of identifying and quantifying risk, these approaches include, but are not limited to, the Basic Indicator, the Standardized approach, the Internal Measurement approach, and the Loss Distribution approach. However, none of these approaches appears to provide for the aggregation of individual risk factors of a plurality transactions on a transaction by transaction basis in order to identify the relative risk of each transaction. In other words, while the various approaches proposed by the Basel Committee attempt to identify and quantify operational risk, such approaches do not appear to provide a mechanism for easily ranking the relative risk of a number of transactions without trying to explicitly quantify such risk (i.e., in terms of capital loss).

Other risk analysis methodologies found in the financial area include, for example, the following:

U.S. Pat. No. 6,119,103, issued Sep. 12, 2000, to Basch et al. relates to financial risk prediction systems and methods.

U.S. Pat. No. 5,978,778, issued Nov. 2, 1999, to O'Shaughnessy relates to automated strategies for investment management.

U.S. Pat. No. 6,003,018, issued Dec. 14, 1999, to Michaud et al. relates to a method for evaluating an existing or putative portfolio having a plurality of assets.

U.S. Pat. No. 5,812,987, issued Sep. 27, 1998, to Luskin et al. relates to an invention for managing assets in one or more investment funds over a specified time.

U.S. Pat. No. 6,055,517, issued Apr. 25, 2000, to Friend et al. relates to a method of simulating future cash flow for a given asset allocation under a variety of economic conditions and measuring the frequency of failure of the cash flow to avoid one or more predefined risks.

U.S. Pat. No. 5,729,700, issued Mar. 17, 1998, to Melnikoff relates to a portfolio selector for selecting an investment portfolio from a library of assets based on investment risk and risk-adjusted return.

U.S. Pat. No. 5,884,287, issued Mar. 16, 1999, to Edesess relates to a computer-implemented system and method to create an optimal investment plan (given wealth goals stated in probabilistic form) and to display the resulting probability distributions of wealth accumulations at future times.

Further, various methods of risk or failure analysis have been proposed for use in such fields as manufacturing, aviation, and disk drive monitoring. These methodologies include, for example, the following:

U.S. Pat. No. 5,828,583, issued Oct. 27, 1998, to Bush et al. relates to a method for predicting an imminent failure of a disk drive.

U.S. Pat. No. 5,956,251, issued Sep. 21, 1999, to Atkinson et al. relates to process of establishing valid statistical dimensional tolerance limits for designs of detail parts that will enable accurate prediction of an economically acceptable degree of non-conformance of a large flexible end item assembly.

Further still, in one type of inventory tracking methodology there is maintained an A-B-C classification of items kept in store. Class A items have to be monitored very closely and should have some safety stock (because it is very costly to be out of stock of this class of item). Class B items are monitored less closely (because it is not as costly to be out of stock of this class of item), and so on. Moreover, in one type of scheduling methodology there is maintained a prioritization of jobs that have to be done by the same resource or machine. Jobs are ranked, or prioritized, based on the dimensions of the workpiece and/or the time it takes to do the job.

OBJECTS AND SUMMARY OF THE INVENTION

It is therefore an object of the present invention to provide a method, software program, and system for ranking relative risk of a plurality of transactions.

It is therefore another object of the present invention to provide a method, software program, and system for ranking relative risk of a plurality of transactions wherein "ranking of relative risk of a plurality of transactions" means ordering each transaction in comparison to each of the other transactions (e.g. ordering may be from higher risk to lower risk or from lower risk to higher risk).

Another object of the present invention is to provide a method, software program, and system for ranking relative operational risk of a plurality of financial transactions (e.g., financial trades in the equity, currency, debt, arbitrage, or fixed income markets).

Another object of the present invention is to provide a method, software program, and system for ranking relative operational risk of a plurality of financial transactions without having to explicitly quantify a particular risk in terms of risk capital.

Another object of the present invention is to provide a method, software program, and system for the aggregation of individual risk factors of a plurality of transactions on a transaction by transaction basis in order to identify the relative risk of each transaction.

By providing a method, software program, and system for ranking relative operational risk of a plurality of financial transactions, the present invention provides a mechanism for readily identifying "outlying" transaction risks (e.g., identifying the 10 riskiest transactions out of a group of 1000).

Such identification of "outlying" transaction risks is clearly advantageous for regulatory or internal auditing/accounting purposes. For example, an internal audit may examine the 10 riskiest transactions out of a group of 1000 to ensure that each of the transactions is in compliance with all applicable rules and regulations.

In a specific embodiment, the present invention could be used to rank: i) the relative risk of all of the transactions made in a given timeframe (e.g., within the last hour, within the last day, within the last week, within the last year); or ii) the x number of riskiest trades made in a given timeframe (e.g., within the last hour, within the last day, within the last week, within the last year), where x is an integer; or iii) the x number of least risky trades made in a given timeframe (e.g., within the last hour, within the last day, within the last week, within the last year), where x is an integer.

BRIEF DESCRIPTION OF THE DRAWINGS

FIG. 2A shows a diagram of various variables associated with the stages and events of FIG. 1 according to an embodiment of the present invention;

FIG. 2B shows a diagram of definitions of various variables of FIG. 2A according to an embodiment of the present invention;

Figure 1:
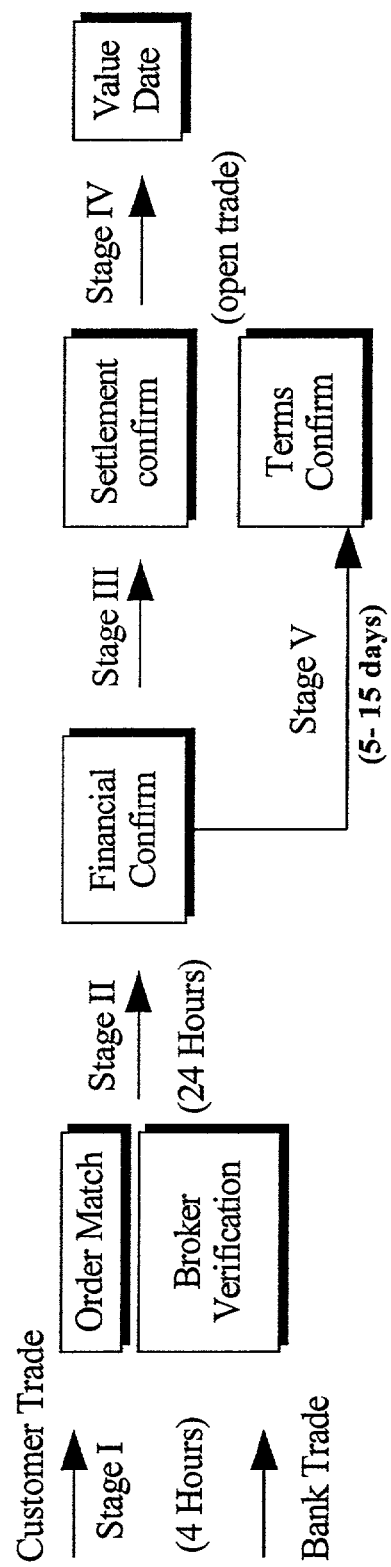
FIG. 1 shows a diagram of transaction stages and events according to an embodiment of the present invention.

Among those benefits and improvements that have been disclosed, other objects and advantages of this invention will become apparent from the following description taken in conjunction with the accompanying figures. The figures constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment a method for ranking relative risk of a plurality of transactions, wherein each of the transactions has associated therewith a plurality of variables is provided, including: assigning a value to each of the variables associated with each of the transactions; aggregating the values assigned to each of the variables on a transaction by transaction basis to produce an aggregate risk level for each transaction; and ranking each of the transactions relative to one another based upon the aggregate risk level corresponding to each transaction.

The step of assigning a value to each of the variables associated with each of the transactions may further comprise assigning a normalized risk factor value to each of the variables associated with each of the transactions based upon a raw value associated with each of the variables of each of the transactions and the step of aggregating the values assigned to each of the variables on a transaction by transaction basis to produce an aggregate risk level for each transaction may further comprise aggregating the normalized risk factor values assigned to each of the variables on a transaction by transaction basis to produce an aggregate risk level for each transaction.

Each value may be normalized to a predetermined normalization range. The predetermined normalization range may be between 0 to 1, inclusive.

Each variable may have associated therewith an operational tolerance and the normalized risk factor value for each variable may be calculated using the formula:

$$RF = \xi \cdot (e^{x/\beta} - 1)$$

where RF=the normalized risk factor value, $\xi = 0.5819767069$, $e = 2.718182818$, x=the raw value of the variable, and $\beta$=the operational tolerance of the variable.

Each variable may be selected from the group of quantitative variables and qualitative variables, wherein each variable which is a quantitative variable may have associated therewith a raw value corresponding to an actual quantitative value, and wherein each variable which is a qualitative variable may have associated therewith a raw value corresponding to a value selected from a predetermined qualitative value range. The predetermined qualitative value range may be between 1 to 10, inclusive.

Each quantitative variable may be selected from the group including: elapsed time, historical volatility, deviation from average volatility, mark-to-market, trader error ratio, sales error ratio, frequency of notional, outgoing confirm delay/elapsed time, time to settlement cutoff, and fail recovery time.

Each qualitative variable may be selected from the group including: client sensitivity, execution method, client operating infrastructure, incoming confirm method, outgoing confirm method, internal credit rating, potential OD rates, payment instruction precedence, regulatory risk, master agreement (provisions for netting), country operating infrastructure, liquidity risk, template precedence, and product complexity.

The step of aggregating the normalized risk factor values assigned to each of the variables on a transaction by transaction basis to produce an aggregate risk level for each transaction may further comprise aggregating the normalized risk factor values using the formula:

$$AR = \sum_{j=1}^{m} w_t^j \cdot R_t^j$$

where AR=the aggregate risk level, $w_t^j$ means the weights of the "j"th variable at time "t", and $R_t^j$ means the normalized risk factor value of the "j"th variable at time "t".

The transactions may be ranked relative to one another in descending order of aggregate risk level. The transactions may be ranked relative to one another in ascending order of aggregate risk level. The risk may be operational risk.

In another embodiment a method for ranking relative risk of a plurality of transactions, wherein each of the transactions has associated therewith a plurality of events and each of the events has associated therewith at least one variable is provided, including: assigning a value to each of the variables associated with each of the transactions; aggregating the values assigned to each of the variables of each event of each transaction to produce a by event aggregate risk level for each event of each transaction; aggregating the by event aggregate risk levels of each transaction to produce a by transaction aggregate risk level for each transaction; and ranking each of the transactions relative to one another based upon the by transaction aggregate risk level corresponding to each transaction.

The step of assigning a value to each of the variables associated with each of the transactions may further comprise assigning a normalized risk factor value to each of the variables associated with each of the transactions based upon a raw value associated with each of the variables of each of the transactions and the step of aggregating the values assigned to each of the variables of each event of each transaction to produce a by event aggregate risk level for each event of each transaction may further comprise aggregating the normalized risk factor values assigned to each of the variables of each event of each transaction to produce a by event aggregate risk level for each event of each transaction.

Each value may be normalized to a predetermined normalization range. The predetermined normalization range may be between 0 to 1, inclusive.

Each variable may have associated therewith an operational tolerance and the normalized risk factor value for each variable may be calculated using the formula:

$$RF = \xi \cdot (e^{x/\beta} - 1)$$

where RF=the normalized risk factor value, $\xi=0.5819767069$, $e=2.718182818$, x=the raw value of the variable, and $\beta$=the operational tolerance of the variable.

The operational tolerance associated with a given variable of a given event may vary in dependence upon the given event of the transaction.

Each variable may be selected from the group of quantitative variables and qualitative variables, wherein each variable which is a quantitative variable may have associated therewith a raw value corresponding to an actual quantitative value, and wherein each variable which is a qualitative variable may have associated therewith a raw value corresponding to a value selected from a predetermined qualitative value range. The predetermined qualitative value range may be between 1 to 10, inclusive.

Each quantitative variable may be selected from the group including: elapsed time, historical volatility, deviation from average volatility, mark-to-market, trader error ratio, sales error ratio, frequency of notional, outgoing confirm delay/elapsed time, time to settlement cutoff, and fail recovery time.

Each qualitative variable may be selected from the group including: client sensitivity, execution method, client operating infrastructure, incoming confirm method, outgoing confirm method, internal credit rating, potential OD rates, payment instruction precedence, regulatory risk, master agreement (provisions for netting), country operating infrastructure, liquidity risk, template precedence, and product complexity.

The step of aggregating the normalized risk factor values assigned to each of the variables of each event of each transaction to produce a by event aggregate risk level for each event of each transaction may further comprise aggregating the normalized risk factor values using the formula:

$$EAR = \sum_{j=1}^{m} w_t^{j;i} \cdot R_t^{j;i}$$

where EAR=the by event aggregate risk level, $w_t^{j;i}$ means the weights of the "j"th variable on the "i"th event at time "t", and $R_t^{j;i}$ means the normalized risk factor value of the "j"th variable on the "i"th event at time "t" and the step of aggregating the by event aggregate risk levels of each transaction to produce a by transaction aggregate risk level for each transaction may further comprise aggregating the normalized risk factor values and the by event aggregate risk levels using the formula:

$$TAR = \sum_{i=1}^{n} \sum_{j=1}^{m} w_t^{j;i} \cdot R_t^{j;i}$$

where TAR=the transaction aggregate risk level, $w_t^{j;i}$ means the weights of the "j"th variable on the "i"th event at time "t", and $R_t^{j;i}$ means the normalized risk factor value of the "j"th variable on the "i"th event at time "t".

The transactions may be ranked relative to one another in descending order of transaction aggregate risk level. The transactions may be ranked relative to one another in ascending order of transaction aggregate risk level.

Each event of each transaction may be selected from the group including: a) order match; b) broker verification; c) financial confirmation; d) settlement confirmation; and e) terms confirmation.

The risk may be operational risk.

In another embodiment a software program for ranking relative risk of a plurality of transactions, wherein each of the transactions has associated therewith a plurality of variables is provided, including: means for assigning a value to each of the variables associated with each of the transactions; means for aggregating the values assigned to each of the variables on a transaction by transaction basis to produce an aggregate risk level for each transaction; and means for ranking each of the transactions relative to one another based upon the aggregate risk level corresponding to each transaction.

The means for assigning a value to each of the variables associated with each of the transactions may further comprise means for assigning a normalized risk factor value to each of the variables associated with each of the transactions based upon a raw value associated with each of the variables of each of the transactions and the means for aggregating the values assigned to each of the variables on a transaction by transaction basis to produce an aggregate risk level for each transaction may further comprise means for aggregating the normalized risk factor values assigned to each of the variables on a transaction by transaction basis to produce an aggregate risk level for each transaction.

Each value may be normalized to a predetermined normalization range. The predetermined normalization range may be between 0 to 1, inclusive.

Each variable may have associated therewith an operational tolerance and the normalized risk factor value for each variable may be calculated using the formula:

$$RF = \xi \cdot (e^{x/\beta} - 1)$$

where RF=the normalized risk factor value, $\xi$=0.5819767069, e=2.718182818, x=the raw value of the variable, and $\beta$=the operational tolerance of the variable.

Each variable may be selected from the group of quantitative variables and qualitative variables, wherein each variable which is a quantitative variable may have associated therewith a raw value corresponding to an actual quantitative value, and wherein each variable which is a qualitative variable may have associated therewith a raw value corresponding to a value selected from a predetermined qualitative value range. The predetermined qualitative value range may be between 1 to 10, inclusive.

Each quantitative variable may be selected from the group including: elapsed time, historical volatility, deviation from average volatility, mark-to-market, trader error ratio, sales error ratio, frequency of notional, outgoing confirm delay/elapsed time, time to settlement cutoff, and fail recovery time.

Each qualitative variable may be selected from the group including: client sensitivity, execution method, client operating infrastructure, incoming confirm method, outgoing confirm method, internal credit rating, potential OD rates, payment instruction precedence, regulatory risk, master agreement (provisions for netting), country operating infrastructure, liquidity risk, template precedence, and product complexity.

The means for aggregating the normalized risk factor values assigned to each of the variables on a transaction by transaction basis to produce an aggregate risk level for each transaction may further comprise means for aggregating the normalized risk factor values using the formula:

$$AR = \sum_{j=1}^{m} w_t^j \cdot R_t^j$$

where AR=the aggregate risk level, $w_t^j$ means the weights of the "j"th variable at time "t", and $R_t^j$ means the normalized risk factor value of the "j"th variable at time "t".

The transactions may be ranked relative to one another in descending order of aggregate risk level. The transactions may be ranked relative to one another in ascending order of aggregate risk level.

In one example, the risk may be operational risk.

In another embodiment a software program for ranking relative risk of a plurality of transactions, wherein each of the transactions has associated therewith a plurality of events and each of the events has associated therewith at least one variable is provided, including: means for assigning a value to each of the variables associated with each of the transactions; means for aggregating the values assigned to each of the variables of each event of each transaction to produce a by event aggregate risk level for each event of each transaction; means for aggregating the by event aggregate risk levels of each transaction to produce a by transaction aggregate risk level for each transaction; and means for ranking each of the transactions relative to one another based upon the by transaction aggregate risk level corresponding to each transaction.

The means for assigning a value to each of the variables associated with each of the transactions may further comprise means for assigning a normalized risk factor value to each of the variables associated with each of the transactions based upon a raw value associated with each of the variables of each of the transactions and the means for aggregating the values assigned to each of the variables of each event of each transaction to produce a by event aggregate risk level for each event of each transaction may further comprise means for aggregating the normalized risk factor values assigned to each of the variables of each event of each transaction to produce a by event aggregate risk level for each event of each transaction.

Each value may be normalized to a predetermined normalization range. The predetermined normalization range may be between 0 to 1, inclusive.

Each variable may have associated therewith an operational tolerance and the normalized risk factor value for each variable may be calculated using the formula:

$$RF = \xi \cdot (e^{x/\beta} - 1)$$

where RE=the normalized risk factor value, $\xi$=0.5819767069, e=2.718182818, x=the raw value of the variable, and $\beta$=the operational tolerance of the variable.

The operational tolerance associated with a given variable of a given event may vary in dependence upon the given event of the transaction.

Each variable may be selected from the group of quantitative variables and qualitative variables, wherein each variable which is a quantitative variable may have associated therewith a raw value corresponding to an actual quantitative value, and wherein each variable which is a qualitative variable may have associated therewith a raw value corresponding to a value selected from a predetermined qualitative value range. The predetermined qualitative value range may be between 1 to 10, inclusive.

Each quantitative variable may be selected from the group including: elapsed time, historical volatility, deviation from average volatility, mark-to-market, trader error ratio, sales error ratio, frequency of notional, outgoing confirm delay/elapsed time, time to settlement cutoff, and fail recovery time.

Each qualitative variable may be selected from the group including: client sensitivity, execution method, client operating infrastructure, incoming confirm method, outgoing confirm method, internal credit rating, potential OD rates, payment instruction precedence, regulatory risk, master agreement (provisions for netting), country operating infrastructure, liquidity risk, template precedence, and product complexity.

The means for aggregating the normalized risk factor values assigned to each of the variables of each event of each transaction to produce a by event aggregate risk level for each event of each transaction may further comprise means for aggregating the normalized risk factor values using the formula:

$$EAR = \sum_{j=1}^{m} w_t^{j;i} \cdot R_t^{j;i}$$

where EAR=the by event aggregate risk level, $w_t^{j;i}$ means the weights of the "j"th variable on the "i"th event at time "t", and $R_t^{j;i}$ means the normalized risk factor value of the "j"th variable on the "i"th event at time "t" and the means for aggregating the by event aggregate risk levels of each transaction to produce a by transaction aggregate risk level for each transaction may further comprise means for aggregating the normalized risk factor values and the by event aggregate risk levels using the formula:

$$TAR = \sum_{i=1}^{n} \sum_{j=1}^{m} w_t^{j;i} \cdot R_t^{j;i}$$

where TAR=the transaction aggregate risk level, $w_t^{j;i}$ means the weights of the "j"th variable on the "i"th event at time "t", and $R_t^{j;i}$ means the normalized risk factor value of the "j"th variable on the "i"th event at time "t".

The transactions may be ranked relative to one another in descending order of transaction aggregate risk level. The transactions may be ranked relative to one another in ascending order of transaction aggregate risk level.

Each event of each transaction may be selected from the group including: a) order match; b) broker verification; c) financial confirmation; d) settlement confirmation; and e) terms confirmation.

In one example, the risk may be operational risk.

In another embodiment a system for ranking relative risk of a plurality of transactions, wherein each of the transactions has associated therewith a plurality of variables is provided, including: memory means for storing a software program; and processing means for processing the software program; wherein the software program includes: means for assigning a value to each of the variables associated with each of the transactions; means for aggregating the values assigned to each of the variables on a transaction by transaction basis to produce an aggregate risk level for each transaction; and means for ranking each of the transactions relative to one another based upon the aggregate risk level corresponding to each transaction.

The means for assigning a value to each of the variables associated with each of the transactions may further comprise means for assigning a normalized risk factor value to each of the variables associated with each of the transactions based upon a raw value associated with each of the variables of each of the transactions and the means for aggregating the values assigned to each of the variables on a transaction by transaction basis to produce an aggregate risk level for each transaction may further comprise means for aggregating the normalized risk factor values assigned to each of the variables on a transaction by transaction basis to produce an aggregate risk level for each transaction.

Each value may be normalized to a predetermined normalization range. The predetermined normalization range may be between 0 to 1, inclusive.

Each variable may have associated therewith an operational tolerance and the normalized risk factor value for each variable may be calculated using the formula:

$$RF = \xi \cdot (e^{x/\beta} - 1)$$

where RF=the normalized risk factor value, $\xi$=0.5819767069, e=2.718182818, x=the raw value of the variable, and $\beta$=the operational tolerance of the variable.

Each variable may be selected from the group of quantitative variables and qualitative variables, wherein each variable which is a quantitative variable may have associated therewith a raw value corresponding to an actual quantitative value, and wherein each variable which is a qualitative variable may have associated therewith a raw value corresponding to a value selected from a predetermined qualitative value range. The predetermined qualitative value range may be between 1 to 10, inclusive.

Each quantitative variable may be selected from the group including: elapsed time, historical volatility, deviation from average volatility, mark-to-market, trader error ratio, sales error ratio, frequency of notional, outgoing confirm delay/elapsed time, time to settlement cutoff, and fail recovery time.

Each qualitative variable may be selected from the group including: client sensitivity, execution method, client operating infrastructure, incoming confirm method, outgoing confirm method, internal credit rating, potential OD rates, payment instruction precedence, regulatory risk, master agreement (provisions for netting), country operating infrastructure, liquidity risk, template precedence, and product complexity.

The means for aggregating the normalized risk factor values assigned to each of the variables on a transaction by transaction basis to produce an aggregate risk level for each transaction may further comprise means for aggregating the normalized risk factor values using the formula:

$$AR = \sum_{j=1}^{m} w_t^{j} \cdot R_t^{j}$$

where AR=the aggregate risk level, $w_t^{j}$ means the weights of the "j"th variable at time "t", and $R_t^{j}$ means the normalized risk factor value of the "j"th variable at time "t".

The transactions may be ranked relative to one another in descending order of aggregate risk level. The transactions may be ranked relative to one another in ascending order of aggregate risk level. The risk may be operational risk.

In another embodiment a system for ranking relative risk of a plurality of transactions, wherein each of the transactions has associated therewith a plurality of events and each of the events has associated therewith at least one variable is provided, including: memory means for storing a software program; and processing means for processing the software program; wherein the software program includes: means for assigning a value to each of the variables associated with each of the transactions; means for aggregating the values assigned to each of the variables of each event of each transaction to produce a by event aggregate risk level for each event of each transaction; means for aggregating the by event aggregate risk levels of each transaction to produce a by transaction aggregate risk level for each transaction; and means for ranking each of the transactions relative to one another based upon the by transaction aggregate risk level corresponding to each transaction.

The means for assigning a value to each of the variables associated with each of the transactions may further comprise means for assigning a normalized risk factor value to each of the variables associated with each of the transactions based upon a raw value associated with each of the variables of each of the transactions and the means for aggregating the values assigned to each of the variables of each event of each transaction to produce a by event aggregate risk level for each event of each transaction may further comprise means for aggregating the normalized risk factor values assigned to each of the variables of each event of each transaction to produce a by event aggregate risk level for each event of each transaction.

Each value may be normalized to a predetermined normalization range. The predetermined normalization range may be between 0 to 1, inclusive.

Each variable may have associated therewith an operational tolerance and the normalized risk factor value for each variable may be calculated using the formula:

$$RF = \xi \cdot (e^{x/\beta} - 1)$$

where RF=the normalized risk factor value, $\xi = 0.5819767069$, $e = 2.718182818$, x=the raw value of the variable, and $\beta$=the operational tolerance of the variable.

The operational tolerance associated with a given variable of a given event may vary in dependence upon the given event of the transaction.

Each variable may be selected from the group of quantitative variables and qualitative variables, wherein each variable which is a quantitative variable may have associated therewith a raw value corresponding to an actual quantitative value, and wherein each variable which is a qualitative variable may have associated therewith a raw value corresponding to a value selected from a predetermined qualitative value range. The predetermined qualitative value range may be between 1 to 10, inclusive.

Each quantitative variable may be selected from the group including: elapsed time, historical volatility, deviation from average volatility, mark-to-market, trader error ratio, sales error ratio, frequency of notional, outgoing confirm delay/elapsed time, time to settlement cutoff, and fail recovery time.

Each qualitative variable may be selected from the group including: client sensitivity, execution method, client operating infrastructure, incoming confirm method, outgoing confirm method, internal credit rating, potential OD rates, payment instruction precedence, regulatory risk, master agreement (provisions for netting), country operating infrastructure, liquidity risk, template precedence, and product complexity.

The means for aggregating the normalized risk factor values assigned to each of the variables of each event of each transaction to produce a by event aggregate risk level for each event of each transaction may further comprise means for aggregating the normalized risk factor values using the formula:

$$EAR = \sum_{j=1}^{m} w_t^{j;i} \cdot R_t^{j;i}$$

where EAR=the by event aggregate risk level, $w_t^{j;i}$ means the weights of the "j"th variable on the "i"th event at time "t", and $R_t^{j;i}$ means the normalized risk factor value of the "j"th variable on the "i"th event at time "t" and the means for aggregating the by event aggregate risk levels of each transaction to produce a by transaction aggregate risk level for each transaction may further comprise means for aggregating the normalized risk factor values and the by event aggregate risk levels using the formula:

$$TAR = \sum_{i=1}^{n} \sum_{j=1}^{m} w_t^{j;i} \cdot R_t^{j;i}$$

where TAR=the transaction aggregate risk level, $w_t^{j;i}$ means the weights of the "j"th variable on the "i"th event at time "t", and $R_t^{j;i}$ means the normalized risk factor value of the "j"th variable on the "i"th event at time "t".

The transactions may be ranked relative to one another in descending order of transaction aggregate risk level. The transactions may be ranked relative to one another in ascending order of transaction aggregate risk level.

Each event of each transaction may be selected from the group including: a) order match; b) broker verification; c) financial confirmation; d) settlement confirmation; and e) terms confirmation.

In one example, the risk may be operational risk.

While the present invention may be used to rank the risk of different types of transactions e.g., financial trades in the equity, currency, debt, arbitrage, or fixed income markets), an example embodiment applied to currency trades will now be described (but is not meant to limit the present invention).

In this regard, and referring now to FIG. 1, a diagram showing the stages and events that a trade goes through according to this embodiment of the present invention is depicted. In this FIG. 1 "events" are milestones that occur (e.g., Order Match, Broker Verification, and Financial Confirm) and "stages" are markers delineating various events. As well known to those of ordinary skill in the art, other currency trades and/or other types of trades may go through different stages and events and/or may go through these same stages and events in a different order. For example, while Order Match and Broker Verification are shown as parallel events of stage 1 in this embodiment, other embodiments could have the two events occurring serially. Further, while stages 3 and 4 are shown as occurring parallel to stage 5, other configurations are possible.

Moreover, it is noted that in this embodiment a trade may require either an Order Match (i.e., the trade is a client trade) or a Broker Verification (i.e., the trade is a bank trade), but not both. In another embodiment the two events may be non-mutually exclusive. Further, in this embodiment the Terms Confirm event of stage 5 is done in parallel with the events of stages 3 and 4. In another embodiment the Terms Confirm event of stage 5 and the events of stages 3 and 4 may occur serially.

In any case, as seen in this FIG. 1, a currency trade according to the present example goes through 5 stages, each delineating one or more events. The specific variables associated with each of the events of this embodiment are shown in more detail in FIG. 2A. It is noted that the variables identified in FIG. 2A are used for the purpose of example only, and that as well known to those of ordinary skill in the art, other currency trades and/or other types of trades may associate different, and/or fewer, and/or more variables to each of the events. In any case, a number of the variables identified in FIG. 2A are defined more specifically in FIG. 2B.

Regarding the timing between the events of the currency trade example depicted in FIG. 1, it is noted that the Order Match, Broker Verification and Financial Confirm events may occur relatively quickly (e.g., on the order of hours), with the Settlement Confirm, Value Date, and Terms Confirm events taking a relatively longer period of time (e.g., on the order of days). It is noted that the above-described timing is used for the purpose of example only, and that as well known to those of ordinary skill in the art, other currency trades and/or other types of trades may utilize different timing between each of the stages and events (e.g. earlier events occurring on the order of minutes for later events occurring on the order of weeks). Regardless, the risk of a trade may be a function of time as well as a function of what stage or event the trade is in. In other words, a trade may be open for many months, for example, and its relative risk ranking compared to other trades may change during that time.

Such relative risk may be obtained via an aggregation function that aggregates the risk level of a number of individual risk components. The aggregation function may yield a single value that represents the relative risk of a given trade versus the relative risk of one or more other trades. The risk levels of the individual risk components that form the input to the aggregation function may be dependent or independent of one another.

Still referring to FIG. 1, it is noted that as a transaction moves through the various stages and events the transaction may be subject to various operational checks/processes to help ensure completeness and accuracy. It is further noted that in the present example (which is presented for illustration only, and is not intended to be restrictive), on the order of 5,000-8,000 new trades may come in to stage 1 on a given day and on the order of 100,000 open trades may exist in the later stages on a given day.

Figure 3:
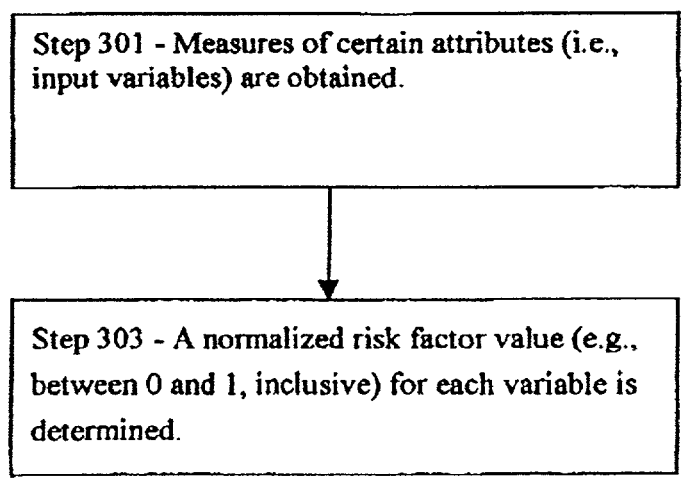
FIG. 3 shows a flowchart identifying the steps carried out in determining individual risk factor components according to an embodiment of the present invention.

Referring now to FIG. 3, a flowchart showing how the risk levels of the individual risk components are determined in the present example embodiment is depicted. At Step 301 measures of certain attributes (i.e., input variables) are obtained. The values of the input variables may be obtained from a database or from another source. The input variables may be updated at certain times. Each input variable may be quantitative (e.g., a measure of time) or qualitative (e.g., a measure of client sensitivity). Quantitative variables may be assigned their actual quantitative values (e.g., a time value or a dollar value). Qualitative variables may be ranked on a qualitative variables scale (e.g. a scale from 1 to 10). Each input variable may have assigned therewith a maximum operational tolerance level (e.g., indicative of maximum risk). The maximum tolerance level for a quantitative variable may be a defined control standard (e.g., unconfirmed trades maximum tolerance level=trade time+x or outgoing confirm delay maximum tolerance level=trade time+y, wherein x and y are appropriate time units). The maximum tolerance level for a qualitative variable may be the top value of the qualitative variable scale (e.g., 10). The maximum tolerance level for a given variable may vary over time and/or may vary for one or more events of the trade. Each input variable may be dependent upon one or more other input variables, and/or may be independent of one or more other input variables, and/or may be random. Each input variable may be a factor in one or more events. Each input variable may be risk weighted differently within one or more events. Each input variable may be fixed (i.e., does not change over time), or may fluctuate essentially continuously (e.g., deviation from historical volatility), or may change only when a trade has reached a new event.

Still referring to FIG. 3, a normalized risk factor value (e.g., between 0 and 1, inclusive) for each variable is determined at Step 303 using the following formula:

$$RF = \xi \cdot (e^{x/\beta} - 1)$$

where RF=the normalized risk factor value, $\xi$=0.5819767069, e=2.718182818, x=the raw value of the variable, and $\beta$=the operational tolerance of the variable.

The operational tolerance associated with a given variable of a given event may vary in dependence upon the given event of the transaction. In this embodiment of the present invention, elapsed time is a variable in 4 events and operational tolerance (i.e., $\beta$) differs in each event as follows: Order Match $\beta$=3 hours; Broker Verification $\beta$=24 hours (i.e., event start time+1 day); Financial Confirmation $\beta$=24 hours (i.e., event start time+1 day); and Terms Confirmation $\beta$=240 hours (i.e., event start time+10 days). Below is Table 1 showing normalized risk factor values corresponding to the elapsed time variable for each of the four events discussed above:

TABLE 1

| Time (x) | Order Match (Stage 1) $\beta$ = 3 hours | Broker Verification (Stage 2) $\beta$ = 24 hours | Financial Confirmation (Stage 3) $\beta$ = 24 hours | Terms Confirmation (Stage 5) $\beta$ = 240 hours |
|---|---|---|---|---|
| 1 hour | 0.23024 | 0.02476 | 0.02476 | 0.00243 |
| 2 hours | 0.55156 | 0.05058 | 0.05058 | 0.00487 |
| 3 hours | 1.00000 | 0.07749 | 0.07749 | 0.00732 |
| 4 hours | 1.00000 | 0.10555 | 0.10555 | 0.00978 |
| 10 hours | 1.00000 | 0.30083 | 0.30083 | 0.02476 |
| 20 hours | 1.00000 | 0.75714 | 0.75714 | 0.05058 |
| 110 hours | 1.00000 | 1.00000 | 1.00000 | 0.33839 |

Finally, as discussed above, the individual risk factor values for each transaction are aggregated to produce a relative risk level corresponding to a particular trade. More particularly, a by event aggregate risk level for each event of each transaction may be calculated using the formula:

$$EAR = \sum_{j=1}^{m} w_t^{j;i} \cdot R_t^{j;i}$$

where EAR=the by event aggregate risk level, $w_t^{j;i}$ means the weights of the "j"th variable on the "i"th event at time "t", and $R_t^{j;i}$ means the normalized risk factor value of the "j"th variable on the "i"th event at time "t" and the by transaction aggregate risk level may be calculated using the formula:

$$TAR = \sum_{i=1}^{n} \sum_{j=1}^{m} w_t^{j;i} \cdot R_t^{j;i}$$

where TAR=the transaction aggregate risk level, $w_t^{j;i}$ means the weights of the "j"th variable on the "i"th event at time "t", and $R_t^{j;i}$ means the normalized risk factor value of the "j"th variable on the "i"th event at time "t".

Figure 4:
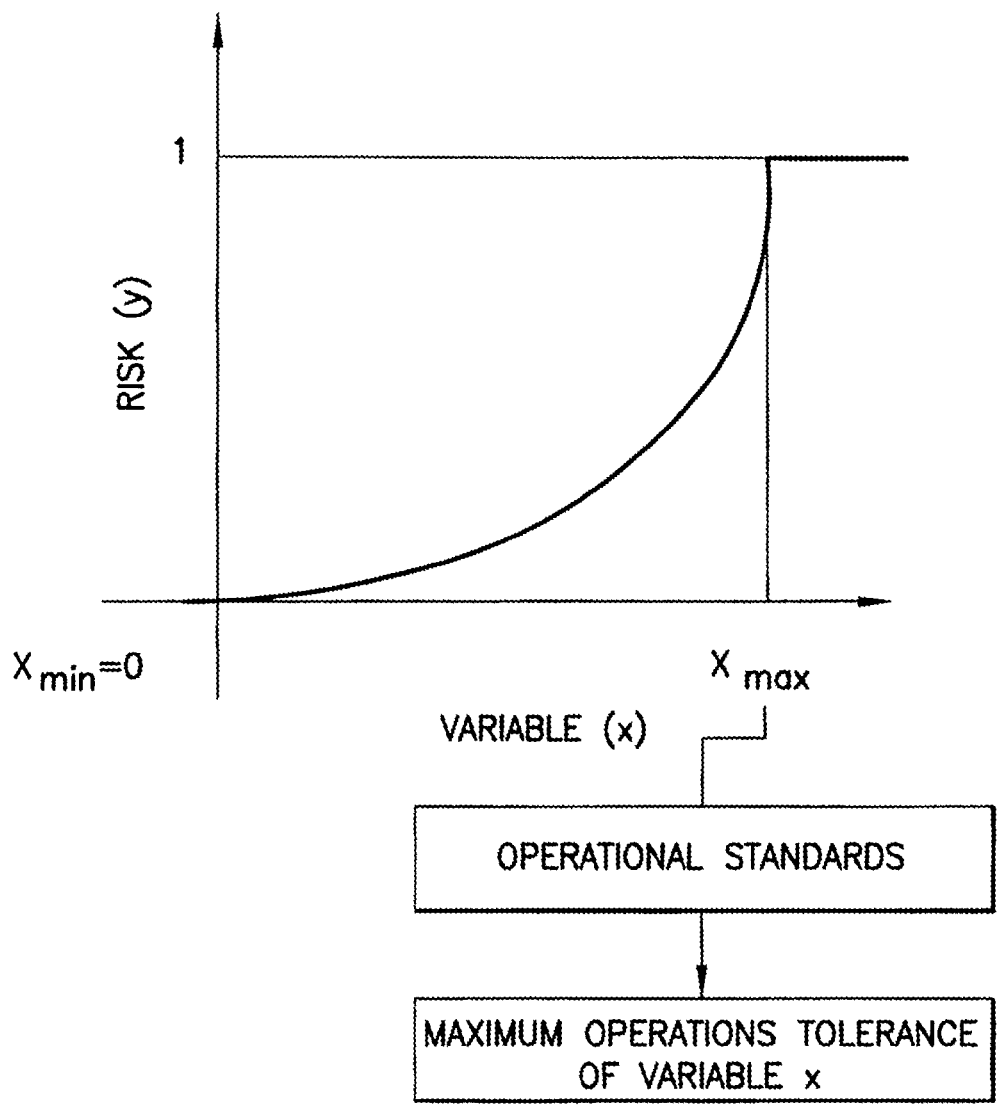
FIG. 4 shows a risk factor curve according to an embodiment of the present invention.

Referring now to FIG. 4, a risk factor curve corresponding to the formula:

$$RF = \xi \cdot (e^{x/\beta} - 1)$$

is depicted. As seen in this figure, risk accelerates as the variable's value approaches the operational tolerance.

Figure 5:
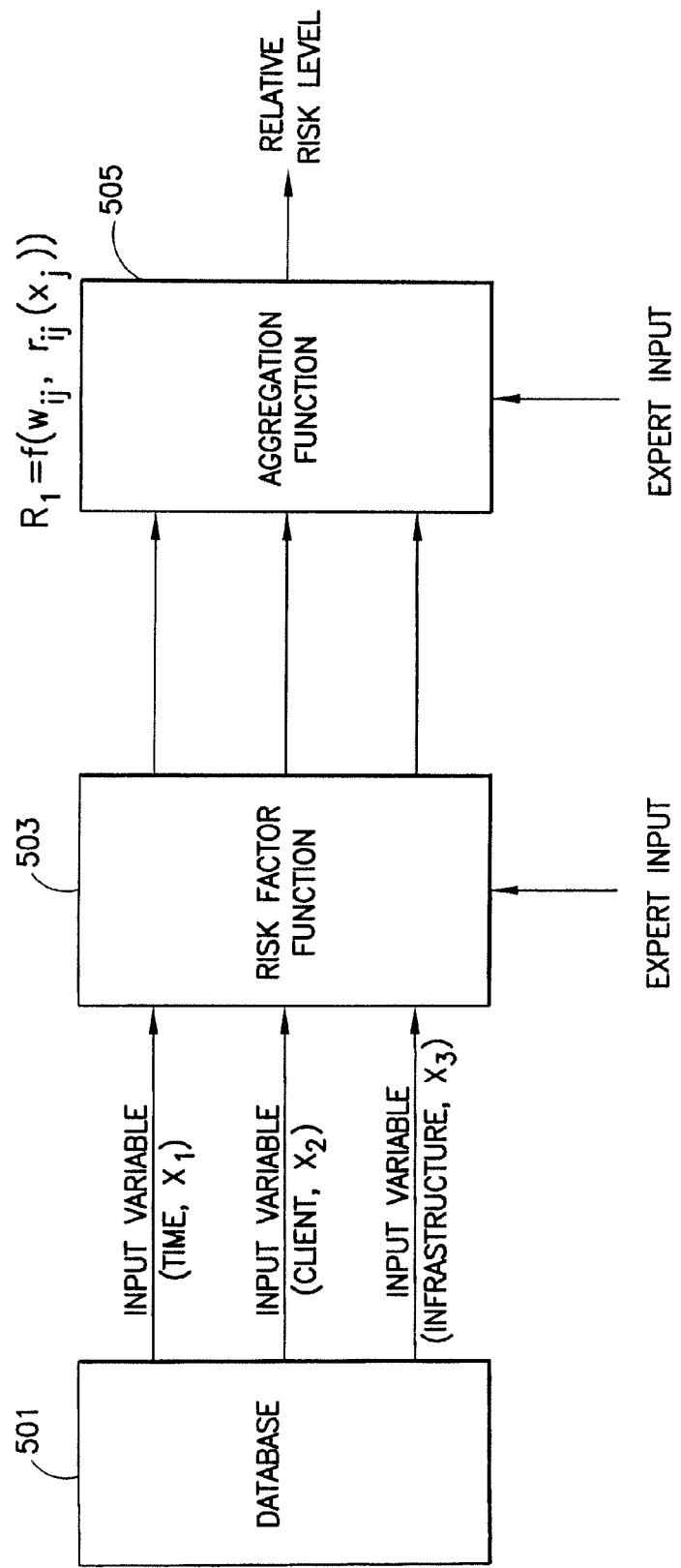
FIG. 5 shows a flowchart identifying the steps carried out in determining the relative risk of a transaction according to an embodiment of the present invention.

Referring now to FIG. 5, which shows an overall relative risk level calculation process according to this embodiment of the present invention, it is seen that various input variables are each applied from Database 501 (which may be a single database as depicted or multiple databases) to Risk Factor Function 503 (which may be a single function as depicted or multiple functions) and the output from the Risk Factor Function is applied to Aggregation Function 505 (which may be a single function as depicted or multiple functions) to generate a relative risk level for each trade. In addition, expert input may be applied to the Risk Factor Function 503 and/or the Aggregation Function 505 to at least partially control the output of the functions. It is noted that while this FIG. 5 shows three representative input variables, any desired input variables may of course be used.

Figure 6:
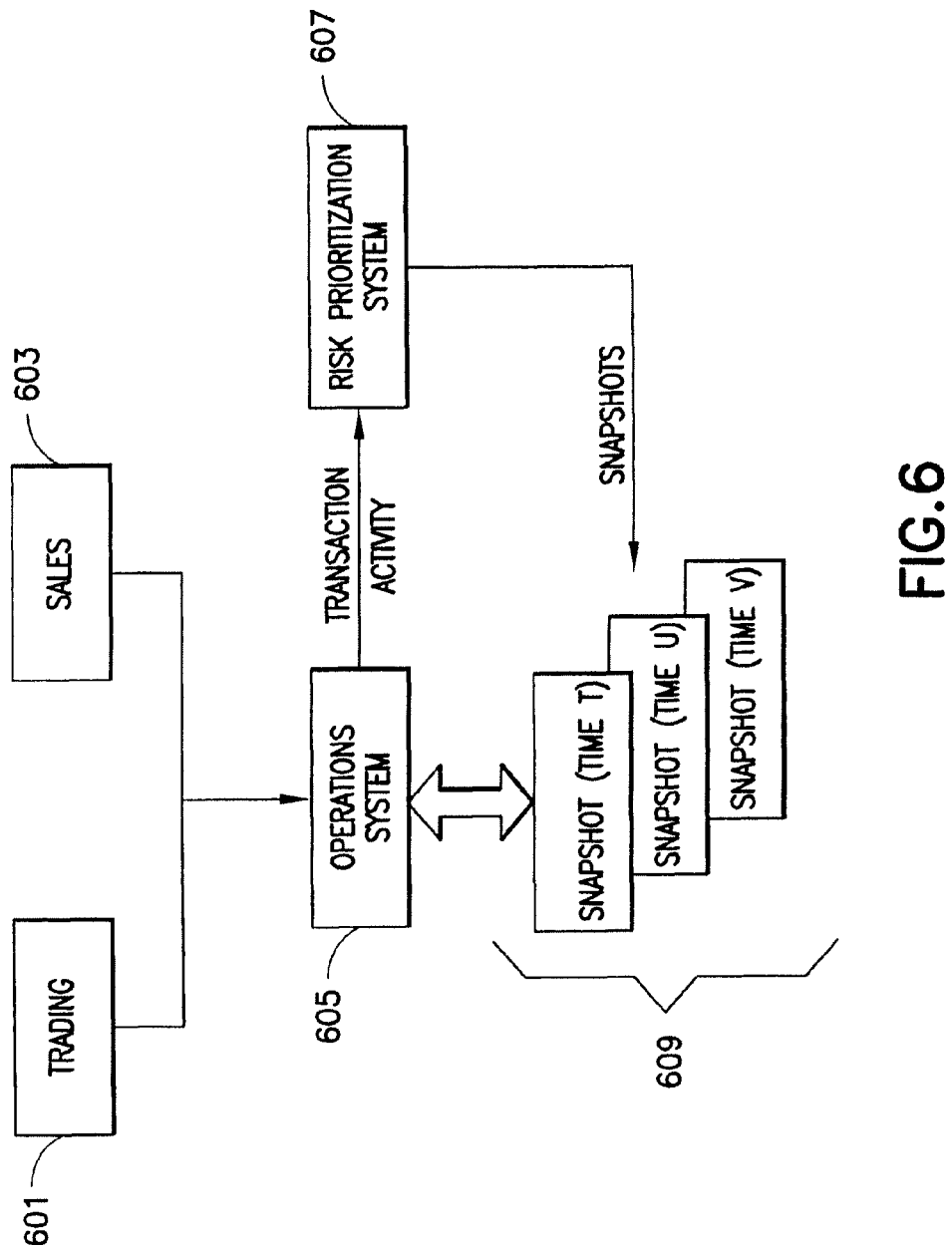
FIG. 6 shows a diagram of overall system flow according to an embodiment of the present invention.

Referring now to FIG. 6, which shows overall system flow in another example embodiment of the present invention, it is seen that Trading Data 601 and Sales Data 603 are sent to Operations System 605 to be forwarded to Risk Prioritization System 607 as Transaction Activity. The Trading Data 601, the Sales Data 603, and the Transaction Activity may be communicated in real-time and/or historically. In any case, Risk Snapshots 609 are periodically posted for the use of Operations System 605. In addition, Operations System 605 may poll Risk Prioritization System 607 for Risk Snapshots 609 when desired.

Figure 7:
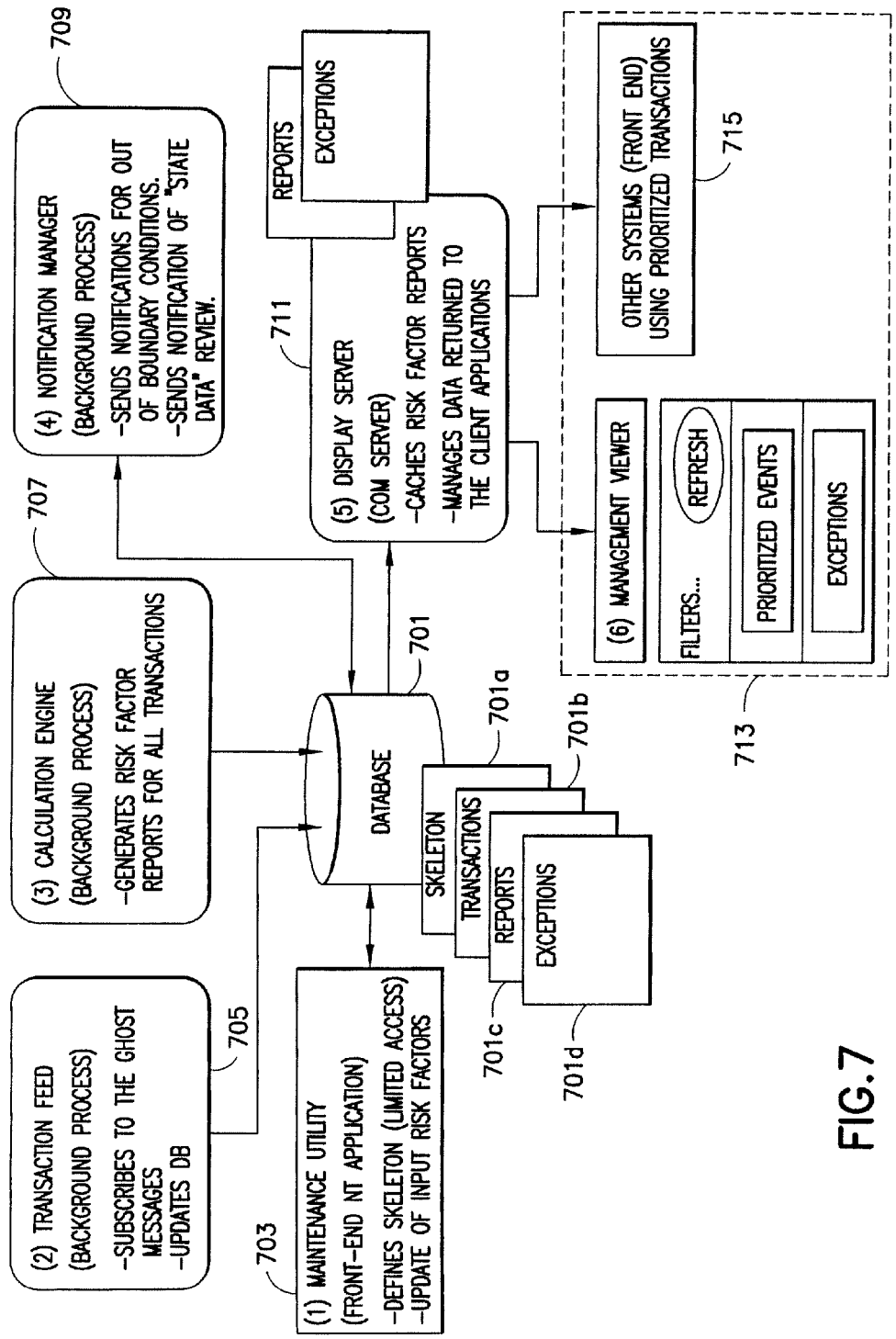
FIG. 7 shows a diagram of a system architecture according to an embodiment of the present invention.

Referring now to FIG. 7, which shows a system architecture in another example embodiment of the present invention, it is seen that Database 701 includes Skeleton 701a, Transactions 701b, Reports 701c, and Exceptions 701d. Further, Database 701 is acted upon by Maintenance Utility 703, Transaction Feed 705, Calculation Engine 707, Notification Manager 709, and Display Server 711. Moreover, Management Viewer 713 (as well as any other desired Front End System 715) interact with Display Server 711 to provide views into the data.

In yet another embodiment of the present invention, the raw values associated with each of the variables of a transaction, and/or the normalized risk factor values associated with each of the variables of a transaction may be identified in connection with selected one(s) of the transaction(s) ranked by the present invention. The identification may be made in the form of a "drill-down" process by which more and more detail is progressively identified to a user. Such identification of the raw values associated with each of the variables of a transaction and/or the normalized risk factor values associated with each of the variables of a transaction may be used to aid in identifying the underlying reasons behind a given relative risk level (i.e. "What is making the transaction so risky?").

More particularly, in this example, after the present invention has determined what are the ten most risky trades, the user may desire to know why a particular trade is so risky. A mechanism could be provided to allow the user to "drill-down" and open a window for a specific trade and look at the particular values of each one of the various risk factors and/or raw variables for that trade. Thus, the user would be able to get a better understanding of why a particular trade is risky.

In yet another embodiment of the present invention, a feedback loop may be employed wherein historical data corresponding to prior transaction rankings, and/or prior raw values associated with given variables, and/or prior normalized risk factor values associated with given variables are used at least partially in determining the ranking of new transactions. In addition, the feedback loop may use (at least partially) input from a user concerning the appropriateness of one or more prior transaction rankings in determining the ranking of new transactions.

Figure 8:
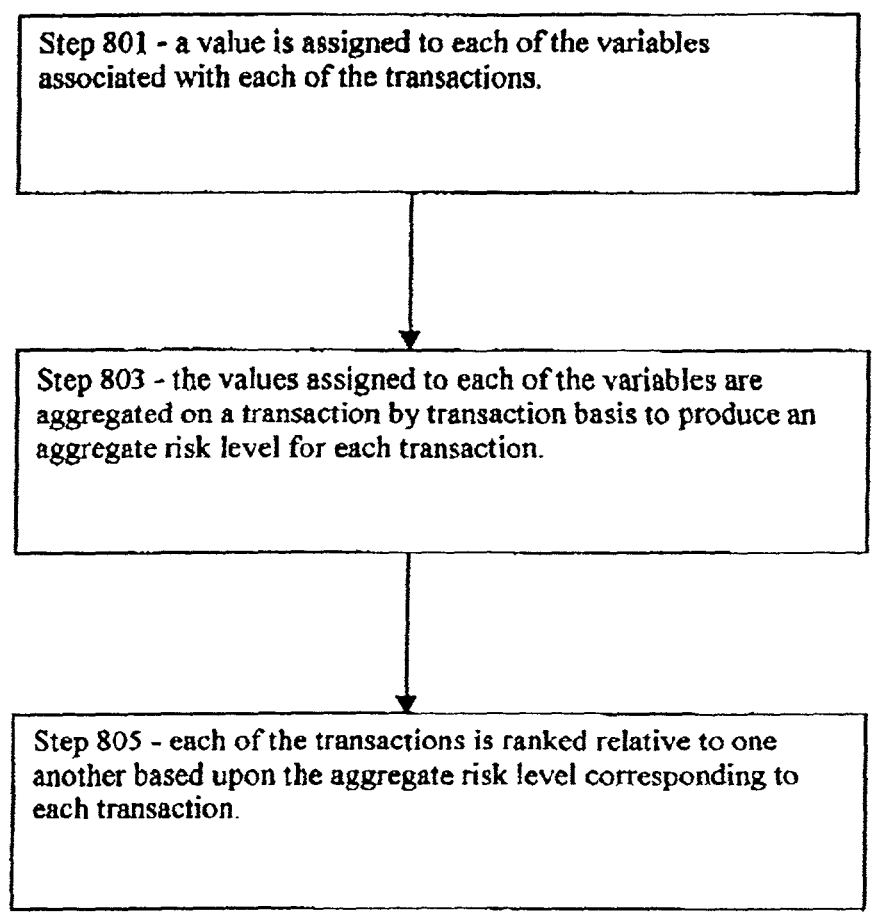
FIG. 8 shows a flowchart of a method according to an embodiment of the present invention.

Referring now to FIG. 8, a flowchart showing a method for ranking relative risk of a plurality of transactions according to another embodiment of the present invention is shown.

More particularly, it is seen that at Step 801a value is assigned to each of the variables associated with each of the transactions. At Step 803 the values assigned to each of the variables are aggregated on a transaction by transaction basis to produce an aggregate risk level for each transaction. At Step 805 each of the transactions is ranked relative to one another based upon the aggregate risk level corresponding to each transaction.

Figure 9:
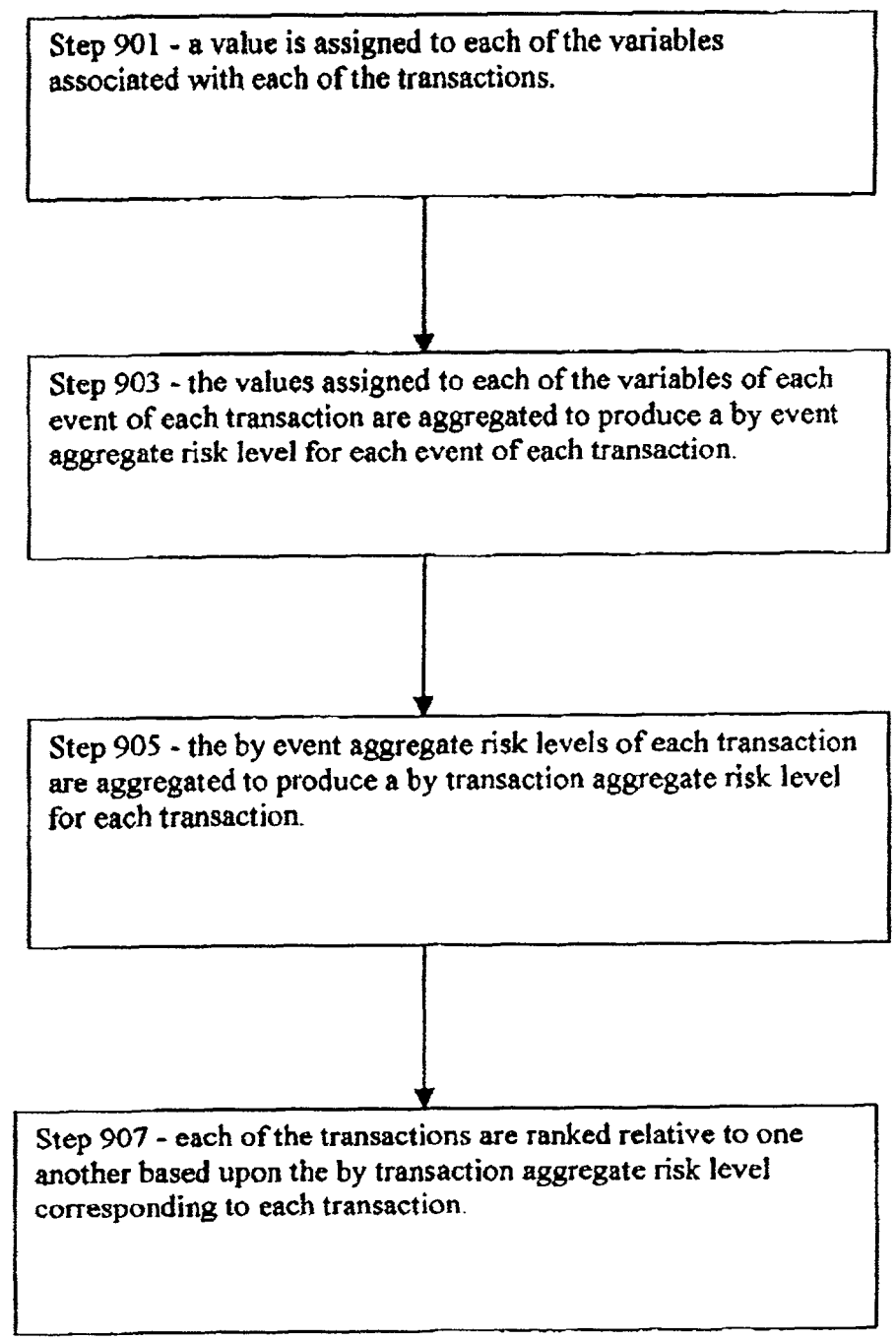
FIG. 9 shows a flowchart of a method according to an embodiment of the present invention.

Referring now to FIG. 9, a flowchart showing a method for ranking relative risk of a plurality of transactions according to another embodiment of the present invention is shown.

More particularly, it is seen that at Step 901a value is assigned to each of the variables associated with each of the transactions. At Step 903 the values assigned to each of the variables of each event of each transaction are aggregated to produce a by event aggregate risk level for each event of each transaction. At Step 905 the by event aggregate risk levels of each transaction are aggregated to produce a by transaction aggregate risk level for each transaction. At Step 907 each of the transactions are ranked relative to one another based upon the by transaction aggregate risk level corresponding to each transaction.

Figure 10:
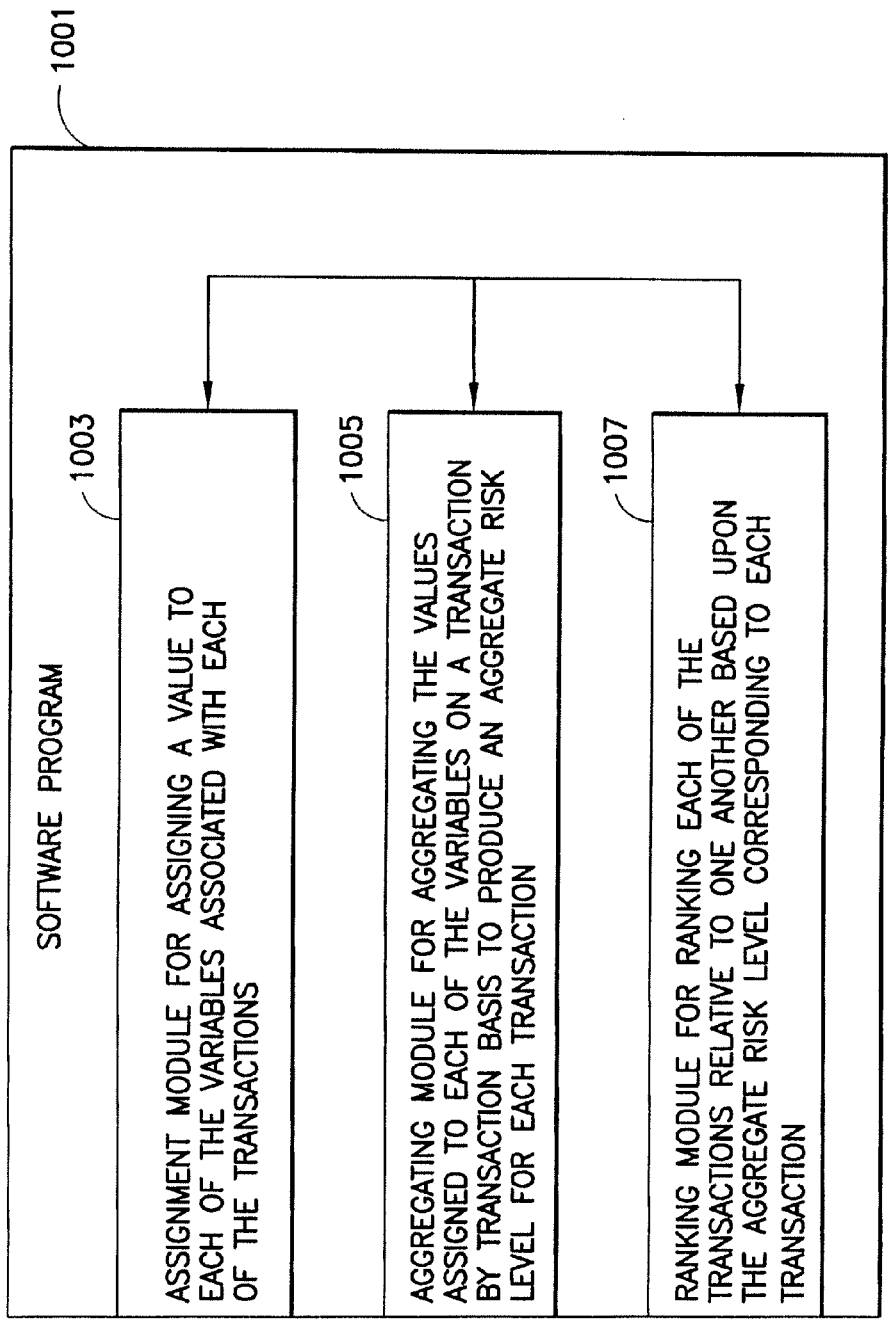
FIG. 10 shows a block diagram of a software program according to an embodiment of the present invention.

Referring now to FIG. 10, a block diagram of a software program for ranking relative risk of a plurality of transactions according to another embodiment of the present invention is shown. As seen in this Fig., Software Program 1001 includes:
1) Assignment Module 1003 for assigning a value to each of the variables associated with each of the transactions;
2) Aggregating Module 1005 for aggregating the values assigned to each of the variables on a transaction by transaction basis to produce an aggregate risk level for each transaction; and
3) Ranking Module 1007 for ranking each of the transactions relative to one another based upon the aggregate risk level corresponding to each transaction.

Assignment Module 1003 may include a method for assigning a normalized risk factor value to each of the variables associated with each of the transactions based upon a raw value associated with each of the variables of each of the transactions and the Aggregating Module 1005 may include means for aggregating the normalized risk factor values assigned to each of the variables on a transaction by transaction basis to produce an aggregate risk level for each transaction.

Figure 11:
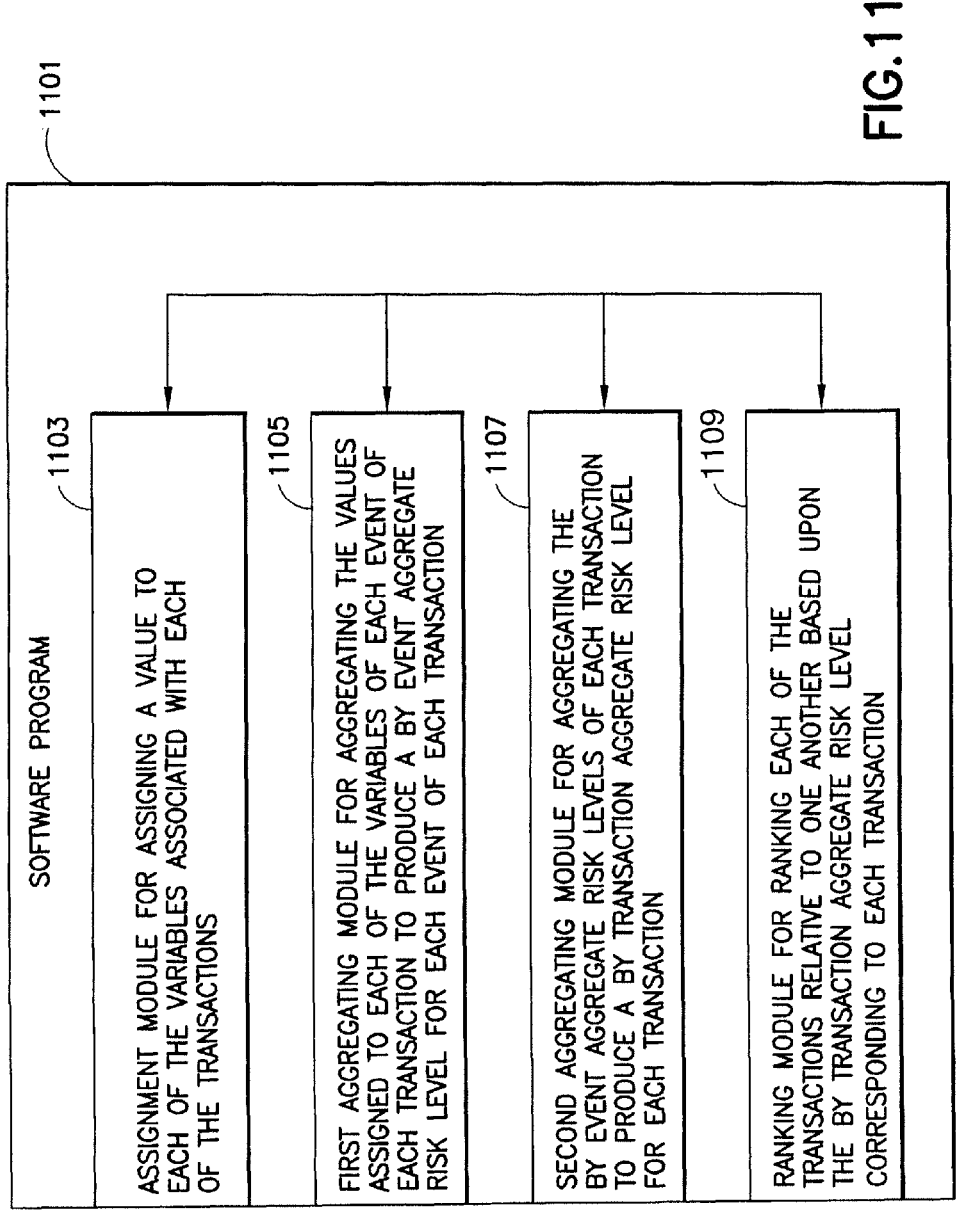
FIG. 11 shows a block diagram of a software program according to an embodiment of the present invention.

Referring now to FIG. 11, a block diagram of a software program for ranking relative risk of a plurality of transactions according to another embodiment of the present invention is shown. As seen in this Fig., Software Program 1101 includes:
1) Assignment Module 1103 for assigning a value to each of the variables associated with each of the transactions;
2) First Aggregating Module 1105 for aggregating the values assigned to each of the variables of each event of each transaction to produce a by event aggregate risk level for each event of each transaction;
3) Second Aggregating Module 1107 for aggregating the by event aggregate risk levels of each transaction to produce a by transaction aggregate risk level for each transaction; and
4) Ranking Module 1109 for ranking each of the transactions relative to one another based upon the by transaction aggregate risk level corresponding to each transaction.

Assignment Module 1103 may include a method for assigning a normalized risk factor value to each of the variables associated with each of the transactions based upon a raw value associated with each of the variables of each of the transactions and the First Aggregating Module 1105 may include a method for aggregating the normalized risk factor values assigned to each of the variables of each event of each transaction to produce a by event aggregate risk level for each event of each transaction.

Figure 12:
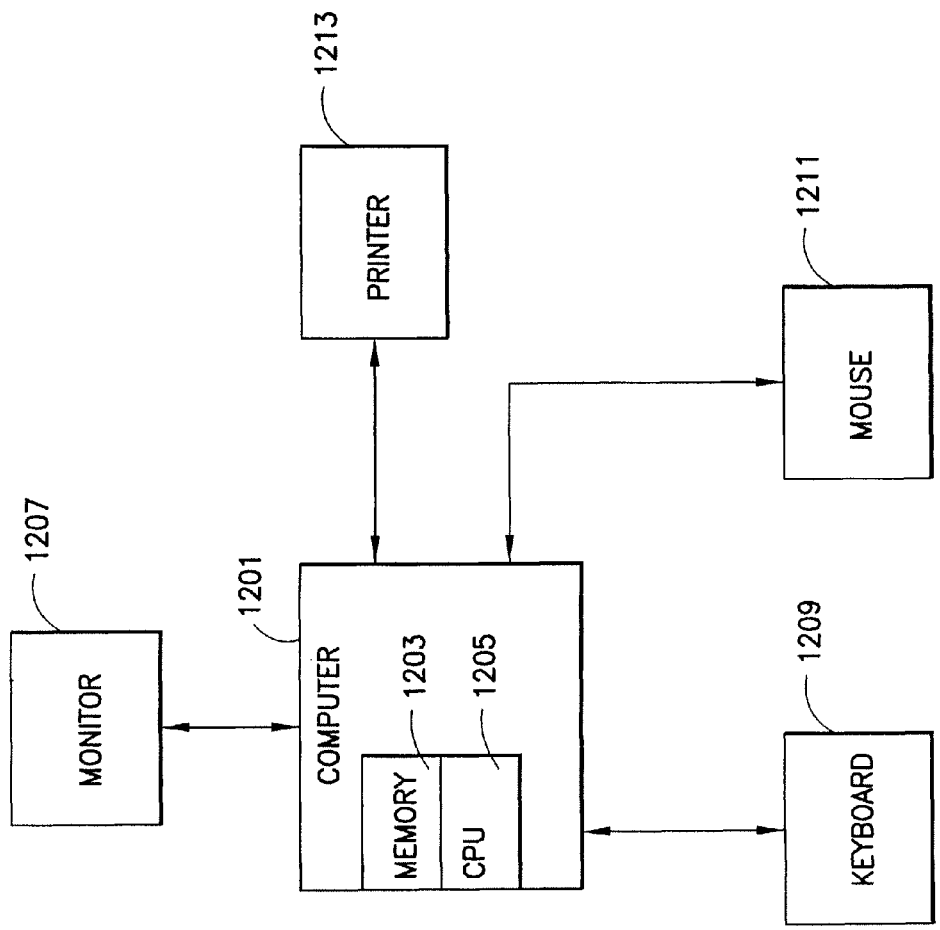
FIG. 12 shows a block diagram of a system according to an embodiment of the present invention.

Referring now to FIG. 12, a block diagram of a system according to another embodiment of the present invention is shown. As seen in this Fig., Computer 1201 includes Memory 1203 for storing a software program (not shown) and CPU 1205 for processing the software program. Monitor 1207, Keyboard 1209, Mouse 1211, and Printer 1213 are connected to Computer 1201 to provide user input/output. Input/output to the software program may also be accomplished via a storage medium (e.g., a hard drive or a CD) and/or a network, each of which is not shown The software program stored in Memory 1203 and processed by CPU 1205 may of course be one of the software programs of the present invention. In any case, the details of each of Computer 1201, Memory 1203, CPU 1205, Monitor 1207, Keyboard 1209, Mouse 1211, and Printer 1213 are well known to those of ordinary skill in the art and will not be discussed further.

While a number of embodiments of the present invention have been described, it is understood that these embodiments are illustrative only, and not restrictive, and that many modifications may become apparent to those of ordinary skill in the art. For example, the present invention may be applied to any tradable product (e.g., equity, currency, debt, arbitrage, or fixed income). Further, while a number of variables useful in ranking risk according to the present invention have been described, any other appropriate variables may of course be used (e.g. Herstaat Risk). More particularly, other exogenous variables (i.e., relating to market conditions) or endogenous variables (i.e., relating to internal conditions) may of course be used. Further still, while the aggregation element(s) of the present invention have been described principally as employing summation and multiplication, other mathematical operator(s) and/or function(s) may of course be used (e.g., hybrids or mixtures of summations and products). Further still, the formula (s) used for aggregation may be static or dynamic. If dynamic, they may change periodically (e.g., every second, every hour, every day, every week), at certain times of the day, at certain times of the week, at certain times of the year, when directed by a user, or when one or more conditions is met. Such conditions could relate to one or more variable raw values and/or one or more normalized risk factor values. If the aggregation formula (s) are dynamic, the weights and/or mathematical operator(s) and/or function(s) may change. Further still, while the generation of the normalized risk factor values has been described principally with regard to a single given formula producing a single given exponential curve, other appropriate formula (s) producing other appropriate curve(s), such as other appropriate exponential curves (s) for example, may of course be used. Other formulas (or functions) may include the linear function, the quadratic function, or any other power or polynomial function, for example. Further still, one or more look-up tables may be used to generate the normalized risk factor values. The look-up table(s) may be associated with one or more variables (e.g., client sensitivity, country infrastructure, product complexity, and so on). The look-up table(s) may be used on their own or in combination with one or more formulas to generate the normalized risk factor values. Further still, the formula (s) and/or look-up table(s) may be static or dynamic. If dynamic, they may change periodically (e.g., every second, every hour, every day, every week), at certain times of the day, at certain times of the week, at certain times of the year, when directed by a user, or when one or more conditions is met. Such conditions could relate to one or more variable raw values and/or one or more normalized risk factor values. Further still, the present invention could be used to rank: i) the relative risk of all of the transactions made in a given timeframe (e.g., within the last hour, within the last day, within the last week, within the last year); or ii) the x number of riskiest trades made in a given timeframe (e.g., within the last hour, within the last day, within the last week, within the last year), where x is an integer; or iii) the x number of least risky trades made in a given timeframe (e.g., within the last hour, within the last day, within the last week, within the last year), where x is an integer. Further still, the present invention may be used as a regulatory tool and/or for internal auditing or accounting. Further still, the present invention may update data including raw variable values and/or normalized risk factor values periodically (e.g., every second, every hour, every day, every week), at certain times of the day, at certain times of the week, at certain times of the year, when directed by a user, or when one or more conditions is met. Such conditions could relate to one or more variable raw values and/or one or more normalized risk factor values. Further still, the transactions ranked by the present invention may be filtered (e.g., by event, by client, or by currency). Further still, the transactions ranked by the present invention may be completed transactions and/or "open" transactions which are being processed. Further still, one or more risk factors may be dynamic and based on a learning mechanism. For example, suppose that the present invention is used to keep track of the number of amendments that a particular trader does on each one of his trades (which, by the way, may also depend on the trade complexity). If the number of the trader's amendments is going down over time (i.e., the trader is getting more experience), then the value of his risk factor is going down. Therefore, in this example the present invention may keep track of statistics pertaining to each individual operator or trader and may dynamically change (based on experience) the values of the appropriate risk factor(s). Of course, any appropriate risk factor (and/or corresponding variable(s)) may be dynamically changed based on such a learning mechanism. Further still, the present invention may be applied to prioritizations in other settings as well (e.g., the maintenance of airplanes by an airline). For example, the present invention may be used to track which airplane(s) should be overhauled first (e.g., the airplanes could be prioritized based on the probabilities that something can go wrong with the airplane as a whole and/or the probabilities that something can go wrong with one or more parts of the airplane). Further still, the memory of the system may comprise a magnetic hard drive, a magnetic floppy disk, a compact disk, a ROM, a RAM, and/or any other appropriate memory. Further still, the computer of the system may comprise a stand-alone PC-type micro-computer as depicted or the computer may comprise one of a mainframe computer or a mini-computer, for example. Further still, another computer could communicate with the software program and/or computer of the system by utilizing a local area network, a wide area network, or the Internet, for example.

What is claimed is:

1. A processor-implemented method for ranking relative risk of a plurality of transactions, comprising:
   determining via a processor a value for each of a plurality of variables associated with each of a plurality of transactions, wherein the determined values for at least some of the plurality of variables are normalized;
   calculating via the processor a transaction risk level for each of the plurality of transactions by aggregating the determined values of the plurality of variables on a by transaction basis; and ranking via the processor each of the transactions relative to one another using the calculated transaction risk level corresponding to each transaction.

2. The method of claim 1, further comprising providing a risk factor report using the transaction rankings.

3. The method of claim 2, wherein the risk factor report includes the determined values for at least some of the plurality of variables.

4. The method of claim 2, wherein the risk factor report includes the normalized values for at least some of the plurality of variables.

5. The method of claim 1, further comprising filtering transactions to be ranked using at least one of: an event, a client, a currency.

6. A processor-implemented method for ranking relative risk of a plurality of transactions comprising:
   obtaining via a processor a plurality of events associated with each of a plurality of transactions;
   determining via the processor a value for each of a plurality of variables associated with each of the plurality of events, wherein the determined values for at least some of the plurality of variables are normalized;
   calculating via the processor an event risk level for each of the plurality of events by aggregating the determined values of the plurality of variables on a by event basis;
   calculating via the processor a transaction risk level for each of the plurality of transactions by aggregating the calculated event risk levels for the plurality of events on a by transaction basis; and
   ranking via the processor each of the transactions relative to one another using the calculated transaction risk level corresponding to each transaction.

7. The method of claim 6, further comprising providing a risk factor report using the transaction rankings.

8. The method of claim 7, wherein the risk factor report includes the determined values for at least some of the plurality of variables.

9. The method of claim 7, wherein the risk factor report includes the normalized values for at least some of the plurality of variables.

10. The method of claim 6, further comprising filtering transactions to be ranked using at least one of: an event, a client, a currency.

* * * * *